United States Patent [19]

Ayers

[11] 4,276,966
[45] Jul. 7, 1981

[54] AUTOMATIC ADJUSTING STRUT

[75] Inventor: David T. Ayers, Birmingham, Mich.

[73] Assignee: Kelsey-Hayes Company, Romulus, Mich.

[21] Appl. No.: 961,322

[22] Filed: Nov. 16, 1978

[51] Int. Cl.³ .............................................. F16D 65/56
[52] U.S. Cl. ......................... 188/79.5 P; 188/196 BA; 192/111 A
[58] Field of Search ................... 188/79.5 P, 79.5 GC, 188/79.5 GE, 196 BA; 192/111 A

[56] References Cited

U.S. PATENT DOCUMENTS

| | | | |
|---|---|---|---|
| 3,360,084 | 12/1967 | Ayers | 188/196 BA |
| 3,526,301 | 9/1970 | Ayers | 188/79.5 GC |
| 3,540,555 | 11/1970 | Bolenbaugh | 188/196 BA |
| 3,722,635 | 3/1973 | Torii et al. | 188/79.5 P |
| 4,079,819 | 3/1978 | Shirai et al. | 188/79.5 P |
| 4,146,117 | 3/1979 | Kawaguchi et al. | 188/196 BA |

Primary Examiner—Edward R. Kazenske
Attorney, Agent, or Firm—Ralph J. Skinkiss; William P. Hickey

[57] ABSTRACT

A generally self-contained automatic adjusting strut having many uses including that of an automatic adjuster for the shoes of a friction brake. The unit comprises a carrier having a threaded strut expansible outwardly therefrom by means of a star wheel. The star wheel is periodically rotated to compensate for wear adjustment by an adjusting lever pivoted to the carrier and containing an actuating tang that extends between two abutments on the carrier which limit the rotation of the adjusting lever to a prescribed amount, as for example, 1½ teeth of the star wheel. The actuating tang also projects through an opening in the adjacent brake shoe, which is spaced from an abutment edge of the shoe by a prescribed distance (for example 0.040 inches) less than a companion pair of abutments on the carrier, and one of which is the return stop for the actuating tang. The unit includes a combination torsion and compression spring for holding the actuating tang against one of the companion abutments of the carrier, and a second spring is provided for biasing the carrier towards the opposite shoe. The second spring, therefore, assures that the previously described clearance is maintained between the actuating tang and the adjacent shoe.

15 Claims, 7 Drawing Figures

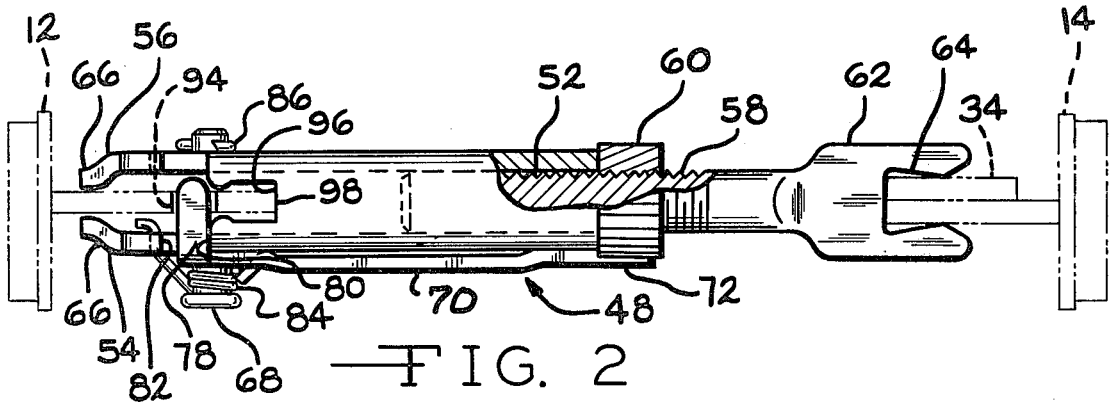
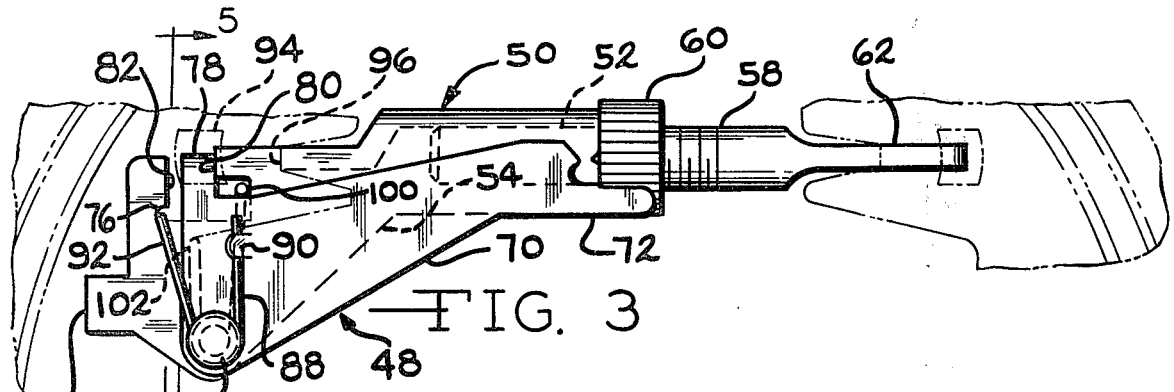
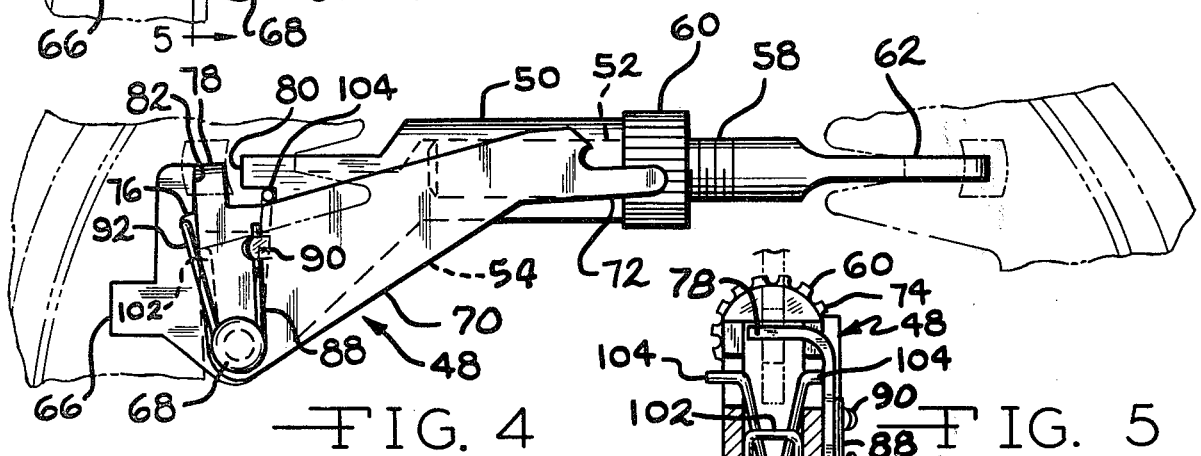
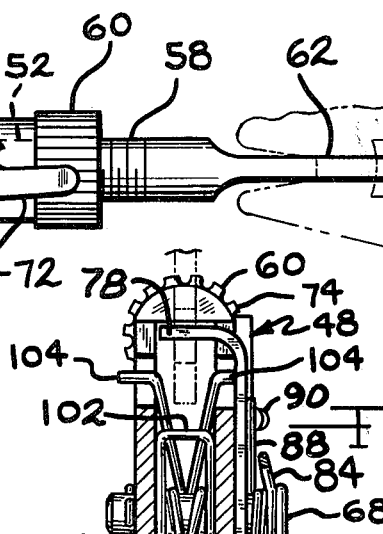
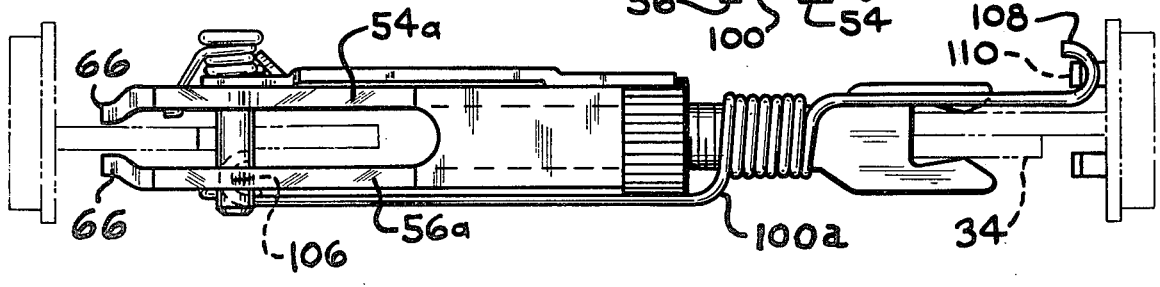

AUTOMATIC ADJUSTING STRUT

BACKGROUND OF THE INVENTION

Brake mechanisms, as used in automotive vehicles and the like, are high production items that have been made for many, many years. The art has always tried to make the devices with fewer and fewer parts and as cheaply as possible. These efforts have gone on for many years and the advances in the art are still in this direction in order that automobiles can remain inexpensive although labor costs have sharply escalated. Past efforts have made present day brakes comprise very few parts and to simplify an already simple structure becomes increasingly more difficult. Changes which now reduce cost or improve efficiency involve subtle changes to parts, but a creativity that is as great or more than is involved in designing machinery to perform a new function.

In this perspective, it is an object of the present invention to produce an automatic adjusting strut, which is either self-contained or requires but a simple hooking onto the structure which it adjusts.

Another object of the invention is the provision of a new and improved automatic adjusting strut whose sensitivity to tolerance stack up is greatly reduced.

Another object of the invention is the provision of a new and improved automatic adjusting strut wherein the relationship between the adjusting lever and star wheel does not change during friction lining wear, and the adjusting lever is not subject to the stretch or bending of an actuating linkage that connects it to the cooperating brake structure which it adjusts.

Another object of the invention is the provision of a new and improved structure of the above type wherein the brake actuating element, as for example, a wheel cylinder, removes the brake return spring forces from the adjusting strut.

Another object of the present invention is the provision of a new and improved structure of the above described type wherein the actuating lever has compliance with the carrier so that its movement is accurately defined.

Another object of the present invention is the provision of a new and improved strut of the above described type that is not self destructive as can occur in some prior art devices when the automatic adjuster freezes to the shoe, or the adjusting lever freezes either to the adjuster body or shoe.

A further object of the invention is the provision of a new and improved automatic adjusting strut wherein the actuating forces on the actuating lever biases the lever against the star wheel so that it does not skip over teeth of the star wheel.

Further objects and advantages of the invention will become apparent to those skilled in the art to which the invention relates from the following description of the preferred embodiments described with respect to the following drawings.

BRIEF DESCRIPTION OF THE DRAWINGS

FIG. 2 is a top view of the embodiment of self-contained automatic adjusting strut shown in FIG. 1.

FIG. 3 is a side view of the embodiment of self-contained automatic adjusting strut in its normal unactuated condition.

FIG. 4 is a view similar to FIG. 3, but showing the adjusting lever in engagement with its movement limiting stop.

FIG. 5 is a fragmentary sectional view taken on the line 5—5 of FIG. 3.

FIG. 6 is a bottom view of a slightly different embodiment of the invention wherein the mousetrap spring is replaced by a tension spring that is easily hooked or attached between the carrier and the opposite shoe of the brake.

DESCRIPTION OF THE PREFERRED EMBODIMENTS

Figures 1, 7:
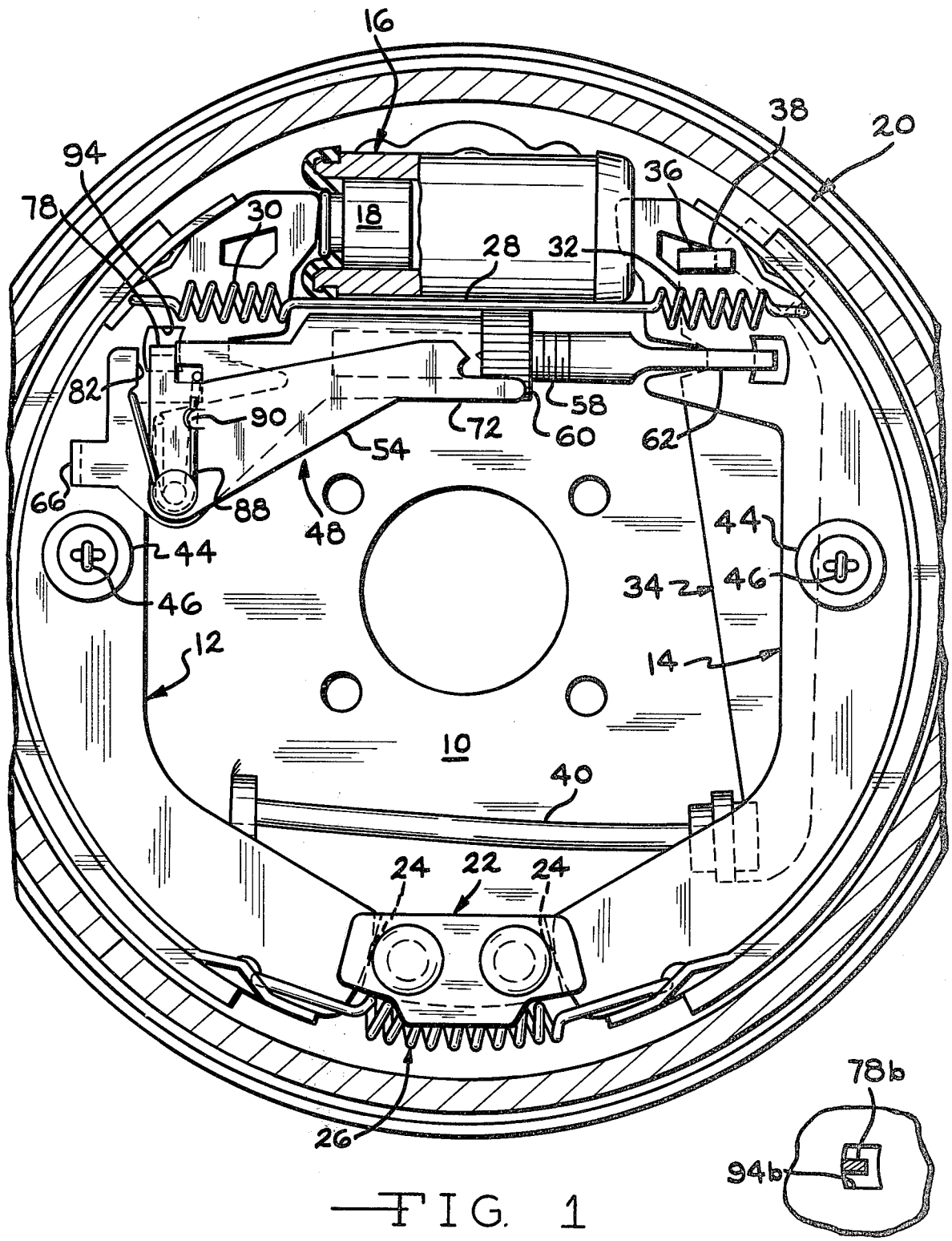
FIG. 1 is a plan view of a leading shoe-trailing shoe brake embodying principles of the present invention.
FIG. 7 is a fragmentary view of still another slightly different embodiment.

Although the automatic adjusting strut of the present invention will have utility in various applications, it is herein shown and described as having particular advantages when used to automatically adjust the clearance between the drum and friction linings of a drum-type friction brake.

The drum-type friction brake shown in FIG. 1 is of the leading-trailing shoe type, and comprises the usual backing plate 10, leading shoe 12, trailing shoe 14, and a wheel cylinder 16 having a pair of opposing pistons 18 for moving the shoes outwardly into engagement with a brake drum 20. The respective pistons 18 abut the upper ends of the respective shoes 12 and 14; and the lower ends of the shoes 12 and 14 abut a fixed anchor 22 that is suitably bolted to the lower portion of the backing plate 10. The opposing abutment faces of the anchor 22 are flat and form an angle of 30 degrees with each other. The ends 24 of the shoes are slightly rounded for rolling contact with the abutment faces 22 for reasons which will soon be made clear. The lower ends of the shoes 12 and 14 are held biased against the fixed anchor 22 by a coil spring 26 which abuts the bottom of the fixed anchor 22, and which coil spring 26 has hooks on its opposite ends that are received in openings in the respective shoes 12 and 14. The bottom of the fixed anchor 22 is arcuately shaped so that the center coiled portion of the spring 26 uniformly abuts therewith, and the openings in the shoes which receive the hooked ends of the spring are located radially to generally correspond with the center of the coil spring when in engagement with the bottom of the fixed anchor 22. This arrangement not only biases the shoes against the anchor, but provides a small radially outward component which comes into operation to move the shoes radially outwardly whenever the shoes move out of frictional engagement with the fixed anchor 22. Because road shock produces generally vertical forces on the brake shoes, and the anchor abutment surfaces are at a 15 degree angle to the vertical, the shoes will not move radially outwardly when spring 26 holds the shoes against the abutment 22.

The brake also includes a shoe return spring 28 having coiled portions 30 and 32 which are spaced apart by a distance sufficient to clear the opposite ends of the wheel cylinder 16. The spring 28 has opposite end hooks that are received in suitable openings in the upper ends of the respective shoes and which holes are so located to hold the spring adjacent the bottom of the wheel cylinder 16. The brake also includes an emergency brake lever 34, the upper end of which has a hooked portion 36 that is received in an opening 38 in the upper end of the trailing shoe 14 adjacent the wheel cylinder 16. The main body portion of the emergency brake lever extends downwardly generally flat against the web of the trailing shoe brake 14; and the lower end of the lever is suitably affixed to a cable 40 which proceeds forwardly out of the backing plate in well known manner. The shoes 12 and 14 are loosely held in position in a manner accommodating both radial and a slight amount of rotational movement by respective hold down springs 44 which are held against the outer face of the webs of the respective shoes by respective headed pins 46 of well known construction.

The automatic adjusting strut 48 shown in FIGS. 1-5 generally comprises a carrier body 50 having an axially extending opening 52 communicating with one end thereof and a pair of depending legs 54 and 56. A threaded strut 58 has its threaded end portion received in the opening 52 with a star wheel type nut 60 threaded onto the strut and in abutment with the end of the carrier 50. The projecting end 62 of the strut 58 is slightly flattened with a generally U-shaped notch 64 in the end of the flattened portion to straddle both the web of the shoe 14 and the body portion of the emergency brake lever 34. The bottom of the notch 64 is planar to act as a common abutment for the emergency brake lever 34 and the web of the shoe 14 for reasons which will be made clear during the description of the operation of the strut.

The legs 54 and 56 at the opposite end of the adjuster are spaced apart for the most part, by a distance corresponding generally to the width of the strut 58, but have bent outer ends 66 that more closely approach each other to guide and center the adjuster with respect to the web of the leading shoe 12. A headed pin 68 extends through suitable openings adjacent the bottom of the depending legs 54 and 56 to pivotally support an actuating lever 70. The actuating lever 70 extends along side of the leg 54, and has a projecting finger 72, that in the normal position of the lever, fits under the side edge of the star wheel 60 at a location to engage the teeth 74 of the star wheel.

The portion of the carrier leg 54 that is positioned generally above the headed pin 68 is provided with a generally U-shaped notch 76 which receives an L-shaped actuating tang 78 that is formed as a bent portion of the actuating lever 70. The generally U-shaped notch 76 is shaped to provide abutments 80 and 82 on opposite sides of the tang 78, and which act as a return stop, and movement limiting stop, respectively for the actuating lever. The actuating lever 70 is normally biased to bring the tang 78 into engagement with the abutment 80 by a combination torsion and compression coil spring 84, the coil portion of which fits around the pin 68 between its head and the actuating lever 70 to hold the lever 70 against the carrier leg 54. The pin 68 is suitably held in position as by a cotter pin 86 which extends through a hole in the opposite projecting end of the pin and is in engagement with the outer face of the carrier leg 56. One leg 88 of the combination spring 84 is engaged behind a bent ear 90 stamped outwardly from actuating lever 70, and the opposite leg 92 of the spring is bent inwardly at its upper end to be received in a recess in the U-shaped notch 76 beneath abutment 82. The spring 84, therefore, not only biases the actuating lever 70 against the carrier body 50, but normally holds the actuating lever 70 in the position shown in FIG. 3 wherein the actuating tang 78 is in engagement with the abutment 80.

The carrier body 50 is made with two spaced apart legs 54 and 56 so that they can straddle the web of the shoe 12. The web of shoe 12 has an opening 94 therein through which the L-shaped actuating tang 78 extends, so that the actuating tang is loosely retained on the shoe 12. The carrier body 50 is provided with a shoe abutment 96 which is spaced by a first predetermined distance inwardly from the actuating lever return stop abutment 80. The web of the leading shoe 12 is provided with an inner edge abutment 98 for engaging the abutment 96 of the carrier body 50; and the opening 94 is spaced from the abutment 98 of the shoe by a second predetermined distance. The second predetermined distance is made less than the first predetermined distance by an amount equal to the sum total of the desired running clearance for both shoes, as for example 0.040 inch. The carrier body 50 and strut 58 are biased away from the shoe 12 towards the shoe 14 by a carrier biasing spring 100 to normally maintain the 0.040 inch clearance previously referred to between the edge of opening 94 and the actuating tang 78, as shown in FIG. 3. The shoe return spring 28 is sufficiently strong that it overpowers the carrier biasing spring 100 and holds it compressed so that it in turn is capable of performing its function. In the embodiment shown in FIGS. 1-5, the carrier biasing spring 100 takes the form of a rat trap type spring having a center U-shaped section 102 which extends across between the legs 54 and 56 for abutment with the web of the shoe 12. The remaining opposite portions 104 of the spring are coiled around the pin 68 towards each other and then extend upwardly to provide laterally extending ends which are received into recesses in the respective legs 54 and 56, and which recesses are part of the U-shaped notches 76. The U-shaped center section 102 is normally biased outwardly from the position shown in the drawings for engagement by the shoe 12 and is overpowered by the shoe return spring 28, so that the shoe return spring 28 compresses the carrier biasing spring 100 and forces the strut to the right as viewed in the drawings. The opening in the actuating lever 70 through which the pin 68 extends is sufficiently large to permit the tang 78 to be rocked out of the opening 94; and the spring 84 will accommodate this movement. It will now be seen that the strut shown in FIGS. 1-5 is a totally self-contained unit that is easily installed by merely slipping the U-shaped notch 64 into the appropriate groove of the trailing shoe 14, and by slipping the legs 54 and 56 upwardly over the web of the leading shoe 12, while holding the tang 78 outwardly. When the tang 78 is moved in position over the opening 94, and is released, it enters the opening 94 to hold the automatic adjuster in place.

It is believed that the operation of the structure so far described will be readily apparent from the above description. To explain the operation briefly, the shoe return spring 28 normally biases the shoes towards each other to compress the spring 100 and cause the inner edge abutment 98 of the shoe to move up against the carrier shoe abutment 96, to leave the desired running clearance which the adjuster is to provide between the edge of the opening 94 and the actuating tang 78.

When the wheel cylinder 16 is actuated, the pistons 18 move outwardly to force the shoes toward the drum. The two shoes will move a total of 0.040 inch before the shoe opening 94 starts to engage the actuating tang 78. Further outward movement of the pistons 18 causes the actuating tang 78 to rotate the lever, and in turn rotate the star wheel 60 to cause the strut 58 to be threaded outwardly. Rotation of the star wheel 60 will continue until the tang 78 engages the abutment 82, as shown in FIG. 4. In the brake adjuster shown in the drawing, this is equivalent to a movement of the projecting finger 72 to equal to one and one half star wheel teeth. If further movement of the shoes continues thereafter, the strut would be moved out of engagement with the trailing shoe 14. Normally tang 78 does not engage the abutment 82, however, since this much wear does not usually occur between brake applications. If a severe application occurs, however, which produces extreme thermal expansion, the greatest amount of adjustment which can take place is limited to rotation equivalent to one and one half teeth of the star wheel. Normally the finger 72 will be in engagement with or slightly below the bottom of a tooth, so that a slight additional movement beyond 0.040 inch shoe clearance may occur before star wheel rotation. Thereafter, the star wheel will be rotated during brake application to compensate for the wear which occurred during that application.

Upon release of the brakes and retraction of the pistons 18, the coil spring 28 overpowers spring 100 and combination spring 84 moves the tang 78 back against the return stop 80, in which position the finger 72 is in the horizontal position shown in FIGS. 1 and 3.

As best seen in FIGS. 2 and 6, the actuating lever 70 preferably has a center portion which is relieved slightly from the side face of the carrier body 50, while the pivoted and projecting finger ends are flat up against the carrier to provide an accurate path of movement for the projecting finger 72. While the brake shown has been described as providing 0.040 inch of running clearance for the brake, it will be apparent that this can be changed to any desired running clearance by appropriately changing the clearance between the opening 94 and the abutment 80 when shoe abutment 96 is in engagement with shoe edge abutment 98.

It should also be pointed out that the brake shown in FIG. 1 not only adjusts the wear at the top of the shoes 12 and 14, but simultaneously compensates for wear at the bottom of the shoes. During normal actuation, the bottom ends of the shoes roll along the surface of the anchor 22 as the pistons 18 of the wheel cylinder 16 move the shoes outwardly into engagement with the drum. Upon release of the brakes, the bottom ends of the shoes roll back along the surfaces of the anchor 22 to their starting position. Under certain conditions, a sufficient reduction in frictional contact between the shoes and the anchor 22 occurs for the coil spring 26 to reposition the bottom ends of the shoes radially outwardly to give generally uniform lining wear along the surface of the shoes. The combination of the fixed anchor 22, spring 26, and the adjuster of the present invention, which maintains a running clearance, therefore, is highly desirable.

The embodiment shown in FIG. 6 corresponds generally to the embodiment shown in FIGS. 1-5, but differs principally in that the carrier biasing spring 100 is replaced with a different type. Those portions of the embodiment shown in FIG. 6, which correspond generally to portions of the embodiment previously described, are designated by a like reference numeral, characterized further in that a suffix "a" is affixed thereto. The carrier biasing spring 100a shown in FIG. 6 is a coil spring having a center portion coiled about the strut 58 with one end extending forwardly along the rear leg 56a. The forward end has a hook 106 received in the U-shaped notch 76. The other end of the coiled spring 100a extends rearwardly along the bottom of the front side of the strut 58. It has an end hook 108 that is adapted to be caught beneath an ear 110 appropriately formed on the brake shoe 14. It will be seen that the embodiment shown in FIG. 6 is self-contained, but requires an additional simple hooking operation to install it on the brake structure which it is to adjust. The operation of the embodiment shown in FIG. 6 is identical with that previously described excepting that the spring 100a is tensioned to pull the strut against the shoe 14, while the spring 100 is compressed to push the strut against the shoe 14.

Instead of shaping the carrier body 50 to provide the shoe abutment 96, the opening 94 can be provided with a width that is greater than the width of the actuating tang 78 by the desired running clearance, as for example 0.040 inch. With this arrangement, the forward edge of the opening 94 will take the place of the inner edge abutment 98 and will abut the actuating tang 78 to force it into engagement with the abutment 80, and thereby establish the normal released condition of the brake. Such an arrangement is shown in FIG. 7.

The embodiment shown in FIG. 7 corresponds generally to the embodiment shown in FIGS. 1-5, but differs principally in the manner in which the return stop is provided for the leading shoe 12. Those portions of the embodiment shown in FIG. 7 which differ from portions of the embodiment previously described, are designated by a like reference numeral characterized further in that a suffix "b" is affixed thereto. In the embodiment shown in FIG. 7, the return stop 96 is omitted thereby making the carrier 50 simpler to produce. The actuating tang 78b abuts its return stop abutment 80 (not shown because of where the view is taken) and the outer edge of the shoe opening 94b is caused to abut the outer edge of the tang 78b to provide the normal retracted position of the shoe 12. The opening 94b is different from the opening 94 of the previous embodiment in that its width is a precise amount greater than the width of the tang 78b to provide the normal running clearance of the brake, which in the present embodiments is 0.040 inch.

It will be seen that there has been provided an adjusting strut that can be positioned between two reciprocating structures to automatically limit their movement towards each other, to adjust for wear, etc., during each actuation. It will further be seen that the objects heretofore enumerated have been fulfilled; and that there has been provided a unique cooperation of the adjuster with drum type friction brakes.

While the invention has been described in considerable detail, I do not wish to be limited to the particular embodiments shown and described; and it is my intention to cover hereby all novel adaptations, modifications, and arrangements thereof, which come within the practice of those skilled in the art to which the invention relates.

I claim:

1. A self-adjusting strut comprising: a carrier body having a longitudinally extending opening therein; a threaded extensible member projecting in one direction out of said longitudinally extending opening; star wheel means for causing said extensible member to be threaded outwardly of said opening in said direction; a ratchet lever rotatably supported along the side of said carrier with a finger portion positioned for engaging said star wheel means; first and second spaced apart adjuster abutments on said carrier facing in the opposite direction from said extensible member, said first adjuster abutment being adapted to be engaged by a first driven structure abutment it adjusts, said ratchet lever having an actuating tang adapted to abut said second adjuster abutment and a second driven structure abutment, the distance between said adjuster abutments being greater by a predetermined distance than is the spacing of the driven structure abutments; and whereby after a predetermined driven structure movement away from said carrier, the actuating tang is moved by the second driven structure abutment to rotate said ratchet lever and in turn rotate said star wheel means to thread said extensible member out of said carrier body.

2. The adjuster of claim 1 including a third carrier abutment which limits actuating movement of said ratchet lever.

3. The adjuster of claim 2 wherein the end of said carrier opposite said threaded extensible member has two legs to straddle the driven structure, and said first adjuster abutment being positioned between said legs with said second and third carrier abutments being spaced apart on one of said legs, and with said actuating tang extending therebetween.

4. The adjuster of claim 3 including:
a pin for rotatably supporting said ratchet lever to said carrier, a rat-trap-type coil spring positioned about said pin with each leg of the coil spring being held by a respective leg of said carrier and the center portion of the spring serving to abut the adjusted structure and bias the adjuster against the opposite element of the adjusted structure.

5. The adjuster of claim 3 including a coil spring around said extensible member with one end retained by said carrier and the opposite end provided with a hook for attaching to the element of the adjusted structure which the extensible member abuts.

6. The adjuster of claim 1 wherein said carrier has a generally flat surface generally tangential with the arc of the bottom of the teeth of said star wheel, and said ratchet lever has a portion which rides on said flat surface.

7. The adjuster of claim 6 including: a pin for rotatably supporting said ratchet lever to said carrier, and a combination torsion and compression coil spring around said pin biasing said ratchet lever against said carrier and causing said actuating tang to be biased against said second carrier abutment.

8. A self-adjusting strut for use between opposing worked upon elements, and comprising: a carrier body having a bifurcated end with first and second legs for straddling one of the worked upon elements and an opposite end with a longitudinally extending opening communicating therewith; a threaded extensible member projecting in one direction out of said longitudinally extending opening; a star wheel for causing said extensible member to be threaded out of said opening; a ratchet lever along one side of said carrier with a portion positioned for engaging said star wheel; a pin extending through an opening in said ratchet lever and extending through openings in said legs; a combination torsion and compression coil spring on said pin forcing said ratchet lever against the side of said carrier, said coil spring having opposite end legs that are biased apart with one of its legs being held by said carrier and the other by said ratchet lever; a first abutment on said carrier between said legs and facing away from said extensible member, an opening in one of said first and second carrier legs and providing a second abutment facing away from said extensible member, said opening also providing a third abutment facing said extensible member; an actuating tang on said ratchet lever and extending between said second and third abutments, said actuating tang normally being biased against said second abutment by said coil spring; and spring means for biasing the carrier member away from an adjacent worked-upon element and for biasing the extensible member against the other worked-upon element.

9. The self-adjuster of claim 8 wherein said spring means comprises a coil spring about said pin between said legs with one portion restrained by a leg of said carrier and another portion of the spring being positioned for abutment against said one of said worked-upon elements.

10. The self-adjuster of claim 8 wherein said spring means comprises a coil spring around said extensible member with one end attached to said carrier and the other end having a hook for attachment to the worked-upon element to be abutted by said extensible member.

11. A shoe brake comprising: first and second opposing brake shoes; actuating brake means for moving said brake shoes apart; first and second shoe abutments on respective brake shoes for holding said shoes apart; an opening through said first shoe and having one side abutment surface spaced a predetermined distance from said first shoe abutment; an adjuster carrier having first and second legs straddling said first shoe and a longitudinally extending opening facing said second shoe; a threaded extensible member projecting from said opening into engagement with said second shoe; a star wheel arranged when rotated to extend said extensible member; a ratchet lever against the side of said carrier for rotating said star wheel and extending said extensible member; a pin extending through said ratchet lever and said first and second carrier legs; a combination torsion and compression coil spring around said pin with its ends positioned between said carrier and ratchet lever to bias said lever past said star wheel in a nonstrut extending direction, said carrier having a first abutment for engaging said first shoe abutment, said first carrier leg having an opening therethrough positioned toward said first shoe from its first carrier abutment and with the adjacent side being a second carrier abutment spaced from said first carrier abutment by a distance greater than the spacing of said shoe opening from said first shoe abutment; an actuating tang on said ratchet lever extending through said first carrier leg opening and said shoe opening; first spring means biasing said carrier toward said second shoe; and shoe return spring means overpowering said first spring means to normally cause said first shoe abutment to engage said first carrier abutment.

12. The shoe brake of claim 11 wherein said first spring means comprises a coil spring around said pin between said legs with one leg abutting said carrier, and another portion abutting said first shoe.

13. The shoe brake of claim 11 wherein said first spring means comprises a coil spring around said strut with one end being retained by said carrier and the other end having a hook for attachment to said second shoe.

14. A friction brake comprising: first and second opposing shoes with said first shoe having an opening therein forming inwardly and outwardly facing abutments; actuating brake means for moving said brake shoes apart; an adjuster carrier having first and second legs straddling said first shoe and a longitudinally extending opening facing said second shoe; a threaded extensible member projecting from said opening into engagement with said second shoe; a star wheel arranged when rotated to extend said extensible member; a ratchet lever against the side of said carrier for rotating said star wheel and extending said extensible member; a pin extending through said ratchet lever and said first and second carrier legs; a combination torsion and compression coil spring around said pin with its ends positioned between said carrier and ratchet lever to bias said lever over said star wheel in a non-strut-extending direction, said first carrier leg having an opening therethrough forming an outwardly facing return stop; an actuating tang on said ratchet lever extending through said first carrier leg opening, and said shoe opening; spring means biasing said carrier toward said second shoe; and shoe return spring means overpowering said spring means; said opening in said shoe being arranged so that its inwardly facing abutment biases said tang against said outwardly facing return stop on said first carrier leg, while said outwardly facing abutment of said shoe is out of engagement with said tang by a predetermined brake clearance setting distance.

15. A friction brake comprising: first and second opposing shoes with said first shoe having an opening therein forming inwardly and outwardly facing abutments; actuating brake means for moving said brake shoes apart; an adjuster carrier having a longitudinally extending opening facing said second shoe; a threaded extensible member projecting from said opening into engagement with said second shoe; a star wheel arranged to extend said strut when the star wheel is rotated; a ratchet lever against the side of said carrier for rotating said star wheel; first spring means for biasing said lever over said star wheel in a non-strut-extending direction, said carrier having an outwardly facing abutment for a return stop; an actuating tang on said ratchet lever extending through said shoe opening; second spring means biasing said carrier toward said second shoe; and shoe return spring means overpowering said second spring means, said opening in said shoe being arranged so that its inwardly facing abutment forces said tang against said outwardly facing return stop on said carrier while said outwardly facing abutment of said shoe opening moves out of engagement with said tang by a predetermined brake clearance setting distance.

* * * * *